Jan. 12, 1943.    W. S. ROBINSON    2,308,307
PIPE, PIPE LINING AND METHOD OF MAKING SAME
Filed June 10, 1939
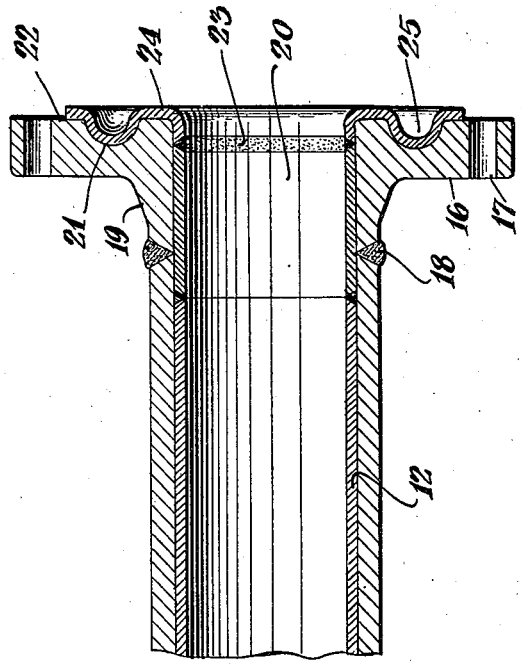
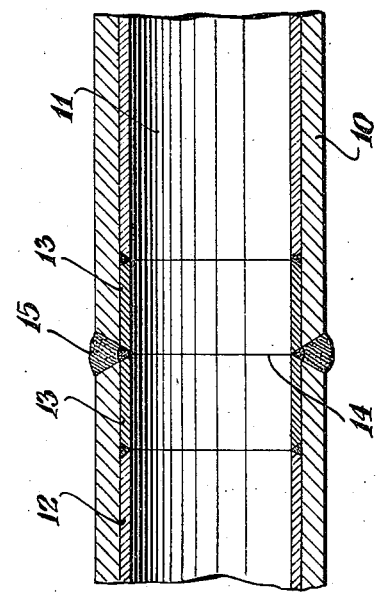
INVENTOR
Walton S. Robinson
BY
Cooper, Kerr & Dunham
ATTORNEYS _Patented Jan. 12, 1943_

2,308,307

UNITED STATES PATENT OFFICE 2,308,307

PIPE, PIPE LINING, AND METHOD OF MAKING SAME

Walton S. Robinson, Montclair, N. J., assignor to Robinson Engineering Corporation, Garwood, N. J., a corporation of New Jersey Application June 10, 1939, Serial No. 278,452

2 Claims. (Cl. 29—162)

This invention relates to improvements in pipes and the like for containing or transmitting liquids which have a corrosive effect upon materials such as are usually employed in the construction of such devices.

Broad objects of the invention are to provide a novel method of making a lined pipe or the like for the purpose stated from steel or other suitable low cost material as well as providing a new article of the character indicated.

Other objects are to provide a lined pipe or similar article which can be manufactured at a relatively low cost; which will have a metallic lining free at all points from attack by corrosive substances even at elevated temperatures; which is suitable for shipment of standard lined lengths which can be assembled in the field with a minimum of joints; and which will have all surfaces at the joints fully protected from corrosion.

The invention consists in a novel method of combining materials and in a new article, both of which are hereinafter explained with references to the drawing accompanying and forming a part of this specification.

The illustrative embodiment shown in the drawing is a lined pipe which has a strong outer wall or shell 10 of mild steel or other suitable material, and a continuous non-corrosive lining 11 which, in this particular construction, is composed of sections of ferritic or straight chrome steel and sections of a material such as a stabilized austenitic chrome nickel steel welded together end to end, the latter being a material which is not affected or changed by temperature within the range usual in welding. The chrome steel is non-corrosive but is affected by the temperatures employed in welding, although the non-corrosive characteristic and good physical properties may be restored by a subsequent heat treatment. Chrome steel is lower in cost than the stabilized austenitic chrome nickel steel and has substantially the same coefficient of expansion as the mild steel 10, otherwise the stabilized austenitic chrome nickel steel might be used throughout.

The outer shell 10 is preferably made of tubular sections of pipe which are welded together end to end, the number of sections so employed depending upon the length desired. After preparing the outer lengths, each of them is lined by inserting a thin walled tube of the non-corrosive lining, and, if necessary, expanding the lining by drawing through it a suitable mandrel, thereby causing close contact between the lining and the outer shell. The larger part of this lining is of a chrome steel preferably one having a 12 to 18 percent chromium content, and other elements within the usual ranges, tubes 12 of that material preferably being made from a flat sheet or strip curled up into tubular form and the abutting longitudinal edges then welded together. While this means a long welded seam, experience indicates that it is the best way to produce thin walled tubes having a uniform wall thickness, with the added advantage that tubes may be produced in any desired lengths so as to afford a continuous lining for a long outer shell made up as above described.

While chrome steel of the analysis mentioned is suitable for the purpose, other alloys having the same characteristics may obviously be employed.

On each end of one of the sections 12 of chrome steel is welded a collar or short tubular section 13 of a different corrosion resisting material which has the advantage of not having its corrosion resisting properties adversely affected by heats within the welding range. These shorter sections or collars 13 are preferably composed of 18-8 chrome nickel steel, stabilized by added columbium (18-8-Cb), the amount of columbium being, in the usual practice, about ten times the amount of carbon in the steel. While the heat employed in welding these collars or short sections to the long ones will adversely affect the chrome steel at one side of the circumferential welds, it will not disadvantageously affect the 18-8-Cb sections nor will the latter sections be affected when two of the collars or short sections 13 are welded together in assembling a run of pipe as hereinafter described.

After a section of the lining has been assembled by welding the 18-8-Cb sections 13 on the ends of chrome steel sections 12, the assemblage is treated at a temperature of about 1450° F. This will restore to the chrome steel portions 12 the original ductility and corrosion resisting properties. In assembling ready for shipment, a length of the outer shell constructed as above described may be worked upon internally to remove any burrs or irregularities from the welds and the assembled and heat-treated liner then inserted and, if necessary, expanded into a close fit. The lengths of the sections of lining are such that the 18-8-Cb ends will be within and terminate substantially in alignment with the ends of the sections of the outer shell. The lined sections may then be assembled in the field by welding together end to end the lengths of outer shell 10 and lining 11 so as to make long lined pipes having a minimum of joints, in fact it is possible in this way to install jointless pipes of great lengths with continuous and efficient non-corrosion linings throughout. Preferably the welding in the field is done by fusing together the abutting faces of the 18–8–Cb ends of the liner as at 14 and then the ends of the outer shell as indicated at 15, but this welding may, of course, be done in any of the usual ways. For making the welds 14 and 15 it is preferred to use a weld rod containing 25% chromium and 20% nickel, as that alloy seems best to prevent embrittlement both in the deposited weld metal and in the pipe 10 and lining 11.

Where it is desired to make a joint in the pipe one end of any section of the outer wall may be flanged as shown at 16 to provide a means, including the bolt holes 17, whereby the ends of sections may be bolted together. It is preferred to weld on as at 18 a flanged portion 19 instead of trying to form such a flange by expanding or otherwise deforming the end of the shell 10. These flanged members may be welded on in the shop or in the field as desired. If the latter is to be the practice, the end collar or short section 20 of the 18–8–Cb material should be of sufficient length to be within the weld 18, but it is preferred to weld the flange member 19 in place before the lining tube is inserted. The form of flange shown in the drawing is one commonly used with what are known as ring gaskets. Such gaskets seat in grooves 21 in the faces 22 of the flanges and are compressed in the grooves and between the faces when the sections are bolted together in installing a run of the pipe. The gaskets should, of course, be of a non-corrosive material.

One difficulty with such pipe joints has arisen from corrosion of the faces of the flanges and some complicated and expensive expedients for protecting these faces have become known. In the present invention this effect is produced in a simple and economical manner which is at the same time more efficient than any prior thing known to the applicant. This is accomplished by welding on as at 23 to the piece 20 of 18–8–Cb material of the liner a formed section 24 of the same material which extends across the radial face of the flange and is formed as at 25 to conform to the configuration of the gasket groove. In some instances, where the liner is inserted from the flanged end of a pipe the pieces 20 and 24 of the lining may be unitary, but the construction shown in the drawing permits welding on the flange and then welding on a flanged protector 24 in the field.

When sections or runs of pipe are bolted together at a joint, the ring gaskets will be compressed against the 18–8–Cb material 24 so that the faces of the flanges will be protected against corrosion by that material. The same principle may, of course, be followed where the radial faces of the flanges are flat or of some other configuration and some form of gaskets other than ring gaskets used to make the seal. That is to say, the radial portions of the 18–8–Cb member 24 will be under such gaskets and therefore function in the same way as described in connection with the ring gaskets.

The order of the steps in making the lined pipe herein described may be varied, the important thing being to have the collars or short sections of 18–8–Cb metal or metal having similar characteristics abutting at or coming under points where welds such as the one shown at 18 or the ones shown at 14 and 15 are to be made. In this way the corrosion resisting properties of the lining will not be affected when installations are made in the field. This makes it possible to end weld together in the field a number of sections to produce long runs of protectively lined pipe without damage to the lining and thereby reducing very materially the number of bolted together joints and the troubles arising from them. The method of constructing the sections to make this end-to-end welding possible has been explained in detail, and particularly the heat treating to restore the straight chrome steel has been pointed out. This heating could not, of course, be accomplished as a practical matter in the field.

The protectors 24 for the flanges may be assembled on the linings before insertion in a length of pipe, but if the work is done in the field the collar 20 of 18–8–Cb material provides a means for attaching the shield 24 of that material without leaving a portion at the weld which will be subject to attack by corrosion.

While the new articles and the method of producing them have been described above in detail, the invention may obviously be employed in other ways, and it is not the desire to be limited by that description except to the extent indicated by the claims which follow.

What is claimed is:

1. A section of pipe for use in constructing a line for transmitting corrosive substances, comprising a tubular outer shell of steel, and a tubular lining unit of substantially the same length as the outer shell and consisting of a short section of stabilized austenitic chrome nickel steel within each of the ends of the outer shell and straight chrome steel integral with and between said sections.

2. The method of making from sections a run of protectively lined pipe for transmitting corrosive substances which comprises constructing a tubular lining section of straight chrome steel for each pipe section somewhat shorter than the pipe section, welding to each end of each liner section a short section of stabilized austenitic chrome nickel steel of sufficient length to give a total length for each liner section substantially the same as a pipe section, heat treating the assembled lining section to restore to the straight chrome steel its original ductility and corrosion resisting properties at the points where those properties have been adversely affected by welding heat, inserting the heat treated sections within the pipe sections, and then welding together end-to-end the stabilized austenitic chrome steel ends of liners and the ends of the enclosing sections of pipe.

WALTON S. ROBINSON.